United States Patent
Walker

(10) Patent No.: US 10,681,010 B2
(45) Date of Patent: Jun. 9, 2020

(54) ESTABLISHING A CONNECTION BETWEEN A USER DEVICE AND AN ACCESS ZONE

(71) Applicant: HUAWEI TECHNOLOGIES CO., LTD., Shenzhen, Guangdong (CN)

(72) Inventor: William Robert Walker, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 15/581,149

(22) Filed: Apr. 28, 2017

(65) Prior Publication Data

US 2017/0230335 A1 Aug. 10, 2017

Related U.S. Application Data

(63) Continuation of application No. PCT/CN2014/090106, filed on Oct. 31, 2014.

(51) Int. Cl.
*G06F 21/00* (2013.01)
*H04L 9/00* (2006.01)
(Continued)

(52) U.S. Cl.
CPC .......... *H04L 63/0272* (2013.01); *G06F 21/53* (2013.01); *H04L 63/0209* (2013.01);
(Continued)

(58) Field of Classification Search
CPC ............. H04L 63/0272; H04L 63/0209; H04L 63/083; H04L 63/0853; H04L 63/0861;
(Continued)

(56) References Cited

U.S. PATENT DOCUMENTS 6,321,334 B1 11/2001 Jerger et al.
7,730,302 B2 6/2010 Palekar et al.
(Continued)

FOREIGN PATENT DOCUMENTS

CN 101350721 A 1/2009
CN 101971570 A 2/2011
(Continued)

OTHER PUBLICATIONS

International Search Report dated Jul. 28, 2015 in corresponding to International Patent Application No. PCT/CN2014/090106.
(Continued)

*Primary Examiner* — Haresh N Patel
(74) *Attorney, Agent, or Firm* — Conley Rose, P.C.

(57) ABSTRACT

The present disclosure includes: obtaining, by a Virtual Private Network (VPN) server, trust data of a user accessing a first network; determining, by the VPN server, a first trust level corresponding to the trust data according to a first correspondence, wherein the first correspondence comprises the trust data and the first trust level; determining, by the VPN server, a first access zone of the first network corresponding to the first trust level according to a second correspondence, wherein the second correspondence comprises the first trust level and the first access zone; and establishing, by the VPN server, a first VPN connection between a device used by the user and the first access zone.

20 Claims, 6 Drawing Sheets

(51) Int. Cl.
*H04L 29/06* (2006.01)
*G06F 21/53* (2013.01)
*H04L 12/46* (2006.01)

(52) U.S. Cl.
CPC ........ *H04L 63/083* (2013.01); *H04L 63/0853* (2013.01); *H04L 63/0861* (2013.01); *H04L 63/0876* (2013.01); *H04L 63/10* (2013.01); *H04L 63/105* (2013.01); *H04L 63/107* (2013.01); *H04L 12/4633* (2013.01); *H04L 12/4641* (2013.01); *H04L 63/08* (2013.01)

(58) Field of Classification Search
CPC ... H04L 63/0876; H04L 63/10; H04L 63/105; H04L 63/107; G06F 21/53
USPC .......................................................... 726/4
See application file for complete search history.

(56) References Cited

U.S. PATENT DOCUMENTS

| | | | | |
|---|---|---|---|---|
| 7,821,926 | B2 | 10/2010 | Hannel et al. | |
| 9,066,230 | B1* | 6/2015 | Paczkowski | H04W 12/06 370/254 |
| 2006/0031510 | A1* | 2/2006 | Beck | H04L 51/12 709/226 |
| 2006/0117381 | A1* | 6/2006 | Sylvain | H04W 48/20 726/8 |
| 2006/0285493 | A1* | 12/2006 | Manuja | H04L 29/06027 370/235 |
| 2010/0332355 | A1* | 12/2010 | Lopez | G06F 17/5004 705/27.1 |
| 2011/0002341 | A1 | 1/2011 | Damola et al. | |
| 2011/0167101 | A1* | 7/2011 | Hopen | H04L 12/2856 709/202 |
| 2011/0231443 | A1* | 9/2011 | Hannel | H04L 63/105 707/776 |
| 2011/0231541 | A1* | 9/2011 | Murthy | G06F 3/0613 709/224 |
| 2012/0105249 | A1* | 5/2012 | Bauerfeld | H04L 29/12301 340/870.02 |
| 2013/0132547 | A1* | 5/2013 | Reed | H04L 41/00 709/223 |
| 2013/0345530 | A1* | 12/2013 | McRoberts | A61B 5/0022 600/323 |
| 2014/0165128 | A1* | 6/2014 | Auvenshine | H04L 63/20 726/1 |
| 2014/0173731 | A1* | 6/2014 | Mantripragada | H04L 12/66 726/22 |
| 2014/0289791 | A1* | 9/2014 | Acharya | H04L 63/0236 726/1 |
| 2014/0313928 | A1* | 10/2014 | Fernando | H04L 45/02 370/254 |
| 2014/0337243 | A1* | 11/2014 | Dutt | G06Q 50/265 705/325 |
| 2016/0044024 | A1* | 2/2016 | Hwang | H04L 63/0838 726/7 |

FOREIGN PATENT DOCUMENTS

| | | |
|---|---|---|
| CN | 102082663 A | 6/2011 |
| CN | 102255920 A | 11/2011 |
| CN | 102487349 A | 6/2012 |
| WO | 2005/067534 A2 | 7/2005 |

OTHER PUBLICATIONS

International Search Report, dated Jul. 28, 2015, in International Application No. PCT/CN2014/090106 (2 pages).
Extended European Search Report dated Oct. 11, 2017 in corresponding European Patent Application No. 14904888.6.
Chinese Office Action dated Apr. 19, 2019 in corresponding Chinese Patent Application No. 201480081314.7 (5 pages).

* cited by examiner

ESTABLISHING A CONNECTION BETWEEN A USER DEVICE AND AN ACCESS ZONE

CROSS-REFERENCE TO RELATED APPLICATIONS

This application is a continuation of International Application No. PCT/CN2014/090106, filed on Oct. 31, 2014, the disclosure of which is hereby incorporated by reference in its entirety.

TECHNICAL FIELD

The embodiments of the present disclosure relate to remote access technologies, and particularly, to a method for remote access and a server.

BACKGROUND

Remote access technologies are common in enterprise networks (i.e., Intranets). Remote access to an enterprise network is currently accomplished largely through a Virtual Private Network (VPN). The VPN generally uses a public network (e.g., the Internet) to connect a remote branch office or an employee to an enterprise network. The VPN uses a virtual or logical connection through the Internet from the enterprise network to devices in the remote branch office or the employee's device. Generally, remote client software operates within a private network, such as a home network (i.e., a personal access network), for example, the remote client software is run on a user's device, and these software-based solutions create a "tunnel" or a "bridge", so that the user's device can be logically placed inside the enterprise network, or to a network dedicated to remote access connections. This "bridge" or "tunnel" into the enterprise network is static and implemented for each remote user, with a static set of access and security rules.

Current remote access solutions typically rely on identity authentication systems that implement single or a plurality of authentications usually based on the combination of a user identifier (ID) and password. In addition, some remote access solutions replace a password challenge with a biometric read of a fingerprint. Since the current remote access solution merely establishes a fixed remote access to the enterprise network for each user according to the identity authentication, an adaptive security mechanism can not be provided for a remote access.

SUMMARY

To resolve the foregoing technical problem, embodiments of the present disclosure provide a method for remote access and a server, which provides an adaptive security mechanism for a remote access.

In a first aspect, there is provided a method for remote access, including: obtaining, by a Virtual Private Network VPN server, trust data of a user accessing a first network; determining, by the VPN server, a first trust level corresponding to the trust data according to a first correspondence, wherein the first correspondence comprises the trust data and the first trust level; determining, by the VPN server, a first access zone of the first network corresponding to the first trust level according to a second correspondence, wherein the second correspondence comprises the first trust level and the first access zone; and establishing, by the VPN server, a first VPN connection between a device used by the user and the first access zone.

In a first possible implementation form of the method according to the first aspect, the method further includes: monitoring, by the VPN server, a change of the trust data; determining, by the VPN server, a second trust level corresponding to changed trust data according to a third correspondence if the VPN server obtains the changed trust data, wherein the third correspondence comprises the changed trust data and the second trust level; determining, by the VPN server, a second access zone of the first network corresponding to the second trust level according to a fourth correspondence, wherein the fourth correspondence comprises the second trust level and the second access zone; and establishing, by the VPN server, a second VPN connection between the device and the second access zone.

In a second possible implementation form of the method according to the first aspect or according to the any of the preceding implementation forms of the first aspect, the method further includes: comparing, by the VPN server, the second trust level with the first trust level; and keeping, by the VPN server, the first VPN connection alive if the second trust level is higher than the first trust level, and closing, by the VPN server, the first VPN connection if the second trust level is lower than the first trust level.

In a third possible implementation form of the method according to the first aspect or according to the any of the preceding implementation forms of the first aspect, the method includes: monitoring, by the VPN server, a change of the trust data; determining, by the VPN server, a second trust level corresponding to changed trust data according to a third correspondence if the VPN server obtains the changed trust data, wherein the third correspondence comprises the changed trust data and the second trust level; determining, by the VPN server, a second access zone of the first network corresponding to the second trust level according to a fourth correspondence, wherein the fourth correspondence comprises the second trust level and the second access zone; modifying, by the VPN server, configuration of the first VPN connection so that the first VPN connection is changed into a second VPN connection between the device and the second access zone.

In a fourth possible implementation form of the method according to the first aspect or according to the any of the preceding implementation forms of the first aspect, the method includes: determining, by the VPN server, there is a third trust level corresponding to the user, wherein the third trust level is lower than the first trust level; determining, by the VPN server, a third access zone of the network corresponding to the third trust level according to a fifth correspondence, wherein the fifth correspondence comprises the third trust level and the third access zone; establishing, by the VPN server, a third VPN connection between the device and the third access zone.

In a fifth possible implementation form of the method according to the first aspect or according to the any of the preceding implementation forms of the first aspect, the trust data comprises at least one of a trust data element for determining whether the user is reliable, a trust data element for determining whether the device is reliable, and a trust data element for determining whether a second network which connects the device to the first network is reliable.

In a sixth possible implementation form of the method according to the first aspect or according to the any of the preceding implementation forms of the first aspect, the at least one trust data element further comprises information for indicating that the remote access passes a third network which fails to provide a trust data element for determining whether the third network is reliable, and the first trust level is lower than a trust level of the remote access determined by trust data which does not comprise the information.

In a seventh possible implementation form of the trust data element for determining whether the user is reliable comprises an identification of the user, a biometric key, a password, a personal identification number (PIN), a Radio Frequency Identification (RFID) tag, or a Near Field Communication (NFC) Tag; wherein the trust data element for determining whether the device is reliable comprises a serial number of the device, a Media Access Control (MAC) address of the device, an International Mobile Equipment Identity (IMEI) of the device, a Subscriber Identity Module (SIM) number of the device or a Global Positioning System (GPS) position of the device, wherein the second network comprises at least one of an access network and a carrier network, and an Internet exchange network.

In a second aspect, there is provided a server including an obtaining unit, configured to obtain trust data of a user accessing a first network; a determining unit, configured to determine a first trust level corresponding to the trust data according to a first correspondence, wherein the first correspondence comprises the trust data and the first trust level; a second determining unit, configured to determine a first access zone of the first network corresponding to the first trust level according to a second correspondence, wherein the second correspondence comprises the first trust level and the first access zone; and an establishing unit, configured to establish a first VPN connection between a device used by the user and the first access zone.

In a first possible implementation form of the server according to the second aspect, the server of the second aspect includes a monitoring unit, the server further includes a monitoring unit, configured to monitor a change of the trust data; the first determining unit is further configured to determine a second trust level corresponding to the changed trust data according to a third correspondence if the monitoring unit obtains the changed trust data, wherein the third correspondence comprises the changed trust data and the second trust level, the second determining unit is further configured to determine a second access zone of the first network corresponding to the second trust level according to a fourth correspondence, wherein the fourth correspondence comprises the second trust level and the second access zone; and the establishing unit is further configured to modify configuration of the first VPN connection so that the first VPN connection is changed into a second VPN connection between the device and the second access zone.

In a second possible implementation form of the server according to the second aspect or according to the any of the preceding implementation forms of the second aspect, the server further includes a comparing unit, configured to compare the second trust level with the first trust level, wherein the establishing unit is further configured to keep the first VPN connection alive if the second trust level is higher than the first trust level, and close the first VPN connection if the second trust level is lower than the first trust level.

In a third possible implementation form of the server according to the second aspect or according to the any of the preceding implementation forms of the second aspect, the server further comprises a monitoring unit, configured to monitor a change of the trust data; the first determining unit is further configured to determine a second trust level corresponding to the changed trust data according to a third correspondence if the monitoring unit obtains the changed trust data, wherein the third correspondence comprises the changed trust data and the second trust level; the second determining unit is further configured to determine a second access zone of the first network corresponding to the second trust level according to a fourth correspondence, wherein the fourth correspondence comprises the second trust level and the second access zone; and the establishing unit is further configured to modify configuration of the first VPN connection so that the first VPN connection is changed into a second VPN connection between the device and the second access zone.

In a fourth possible implementation form of the server according to the second aspect or according to the any of the preceding implementation forms of the second aspect, the first determining unit is further configured to determine there is a third access zone corresponding to the user, wherein the third trust level is lower than the first trust level; the second determining unit is further configured to determine a third access zone of the first network corresponding to the third trust level according to a fifth correspondence, wherein the fifth correspondence comprises the third trust level and the third access zone; and the establishing unit is further configured to establish a third VPN connection between the device and the third access zone.

In a fifth possible implementation form of the server according to the second aspect or according to the any of the preceding implementation forms of the second aspect, the trust data comprises at least one of a trust data element for determining whether the user is reliable, a trust data element for determining whether the device is reliable, and a trust data element for determining whether a second network which connects the device to the first network is reliable.

In a sixth possible implementation form of the server according to the second aspect or according to the any of the preceding implementation forms of the second aspect, the trust data further comprises information for indicating that the remote access passes a third network which fails to provide a trust data element for determining whether the third network is reliable, and the first trust level is lower than a trust level of the remote access determined by trust data which does not comprise the information.

In an seventh possible implementation form of the server according to the second aspect or according to the any of the preceding implementation forms of the second aspect, the trust data element for determining whether the user is reliable comprises an identification of the user, a biometric key, a password, a personal identification number (PIN), a Radio Frequency Identification (RFID) tag, or a Near Field Communication (NFC) Tag; wherein the trust data element for determining whether the device is reliable comprises a serial number of the device, a Media Access Control (MAC) address of the device, an International Mobile Equipment Identity (IMEI) of the device, a Subscriber Identity Module (SIM) of the device number of the device or a Global Positioning System (GPS) position of the device, wherein the second network comprises at least one of an access network and a carrier network, and an Internet exchange network.

According to embodiments of the present disclosure, a server determines a trust level of the remote access of a user according to trust data related to the remote access of the user, establishes a VPN connection between the user's device and a first access zone which corresponds to the first trust level. Since a plurality of access zones corresponding to different trust levels are provided for the remote access of the user according to the at least one trust data element, an adaptive security mechanism may be provided for the remote access.

BRIEF DESCRIPTION OF DRAWINGS

To illustrate the technical solutions in the embodiments of the present disclosure more clearly, a brief introduction on the accompanying drawings which are needed in the description of the embodiments is given below.

DESCRIPTION OF EMBODIMENTS

The technical solutions in the embodiments of the present disclosure will be described clearly hereinafter with reference to the accompanying drawings in the embodiments of the present disclosure.

Figure 1:
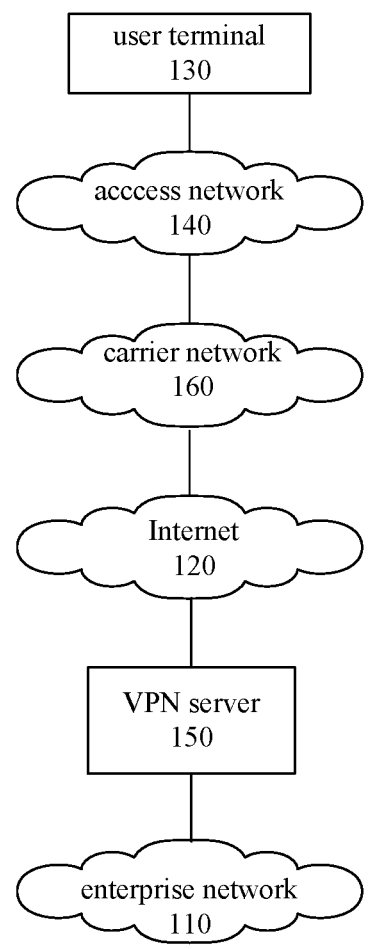
FIG. 1 is a schematic application scenario of a VPN according to an embodiment of the present disclosure.

FIG. 1 is a schematic application scenario of a VPN according to an embodiment of the present disclosure.

As shown in FIG. 1, in this application scenario, a User Equipment (UE) 130 may has remote access to a network (e.g., a network of an enterprise headquarters) 110 through an access network 140, a carrier network 160, a Internet 120 and a VPN server 150. Optionally, the VPN server 150 may be part of the enterprise network 110.

The VPN server 150 may enable a VPN to run over the Internet 120 so that a user outside the network 110 may access the network 110 through the access network 140, the carrier network 160 and the Internet 120. Specifically, the VPN Server 150 may be implemented as a dedicated physical machine or embedded system, as a software element hosted on a compute server node, or as a software element hosted on a virtual machine, which utilizes cloud-based computing architectures in a multi-tenant host computer. The VPN server 150 may communicate with computing devices or servers (not shown in FIG. 1) of the network 110, in which applications, service and data of the enterprises are provided.

While a device used by the user to have remote access to the network 110 is represented by UE 130 in FIG. 1, the UE 130 may be an end device or a personal device, e.g., a desktop, laptop, phone, or tablet, and may access the Internet 120 through an access network 140. The access network 140 may include for example an access point in a WI-FI, WLAN, or other wired/wireless communication technologies. Optionally, the access network 140 may further includes a home network, a branch office network, a hotel network, a connection point network or other networks through which the user accesses the Internet 120.

The carrier network 160 may provide communication between users and a service provider.

It shall be noted that embodiments of the present disclosure may be applied to various VPN technologies and protocols, such as Point to Point Tunneling Protocol (PPTP) VPN, Layer 2 Tunneling Protocol (L2TP) VPN, Internet Protocol security (IPSec) VPN, and Secure Socket Layer (SSL) VPN (e.g., OpenVPN), etc.

Figure 2:
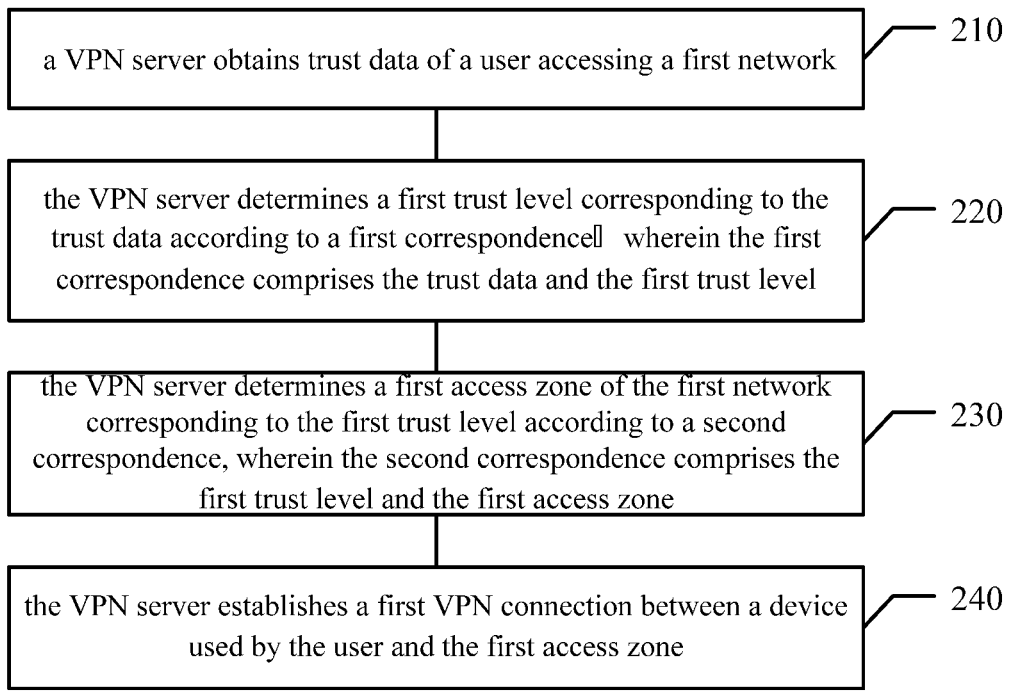
FIG. 2 illustrates a schematic flow chart of a method for remote access according to an embodiment of the present disclosure.

FIG. 2 illustrates a schematic flow chart of a method for remote access according to an embodiment of the present disclosure. The method is performed by a remote access server, for example, the VPN server 150 in the embodiment of FIG. 1. The method of FIG. 2 includes the following contents.

210, a VPN server obtains trust data of a user accessing a first network.

Specifically, the first network may be an enterprise network or the other network to which the user wants to have remote access. The trust data may include a trust element for determining whether the user is reliable. In addition, the trust data may further include a trust element for determining whether a device used by the user is reliable and/or a trust data element for determining whether a second network which connects the device to the first network is reliable. The trust data may be obtained from the user, the device and the second network which connects the device to the first network to determine the trust level of remote access of the user to the first network. For example, the VPN server may obtain the trust data after receiving a remote access request from the device used by the user. Optionally, the remote access request may include the trust data.

220, the VPN server determines a first trust level corresponding to the trust data according to a first correspondence, wherein the first correspondence comprises the trust data and the first trust level.

230, the VPN server determines a first access zone of the first network corresponding to the first trust level according to a second correspondence, wherein the second correspondence comprises the first trust level and the first access zone.

The first trust level is one of a plurality of trust levels, the first access zone is one of a plurality of access zones, and the plurality of trust levels and the plurality of access zones have a one-to-to correspondence.

240, the VPN server establishes a first VPN connection between a device used by the user and the first access zone.

Specifically, the first network which provides the protected applications, services and/or data in the first network may be divided into a plurality of access zones for each user according to a trust policy. The trust policy is used for indicating the first corresponding correspondence and the second correspondence, i.e., what trust level shall be assigned to the remote access of the user according to the trust data related to the remote access of the user, or, how the trust data related to the remote access of the user affects a trust level (also called trust degree) of the remote access of the user. Each access zone may correspond to a certain level of trust in the remote access of the user and each trust level indicates one access privilege of the user. The VPN server may provide a plurality of layers (or depths) of access to the plurality of zones adaptively according to the trust data related to the remote access of the user, which are currently collected from for example the user and the device or a network on the VPN connection to be established between the user and the first network, or other data resources.

For example, when a user wants to have remote access to the first network from the outside, the user may run a VPN client in an end device, and the end device sends a remote access request to the VPN server for remote access to the first network after the VPN client is run. The VPN server collects trust data related to the remote access, and determines a trust level of the remote access according the currently collected trust data and a preset trust policy or rule. Finally, the VPN server establishes a VPN connection between the user's device and an access zone which corresponds to the determined trust level.

According to embodiments of the present disclosure, the VPN server determines a trust level of the remote access of the user according to the trust data related to the remote access of the user, establishes a VPN connection between the user's device and a first access zone which corresponds to the first trust level in the plurality of access zones. Since a plurality of access zones corresponding to different trust levels are provided for the remote access of the user according to the trust data, an adaptive security mechanism may be provided for the remote access, and thus a real-time adaptive security capability is provided with the VPN.

Conventional VPN systems are designed around a principle of point to point security based on fixed networks and secured, designated end-user devices, while evolution of user equipment and Internet access has introduced a plurality of devices per end-user and access mobility. For example, the user has remote access to the VPN from using a device of the enterprise to using a private device of the user, and/or from using a contracted WiFi to using a public WiFi. The embodiment of the present disclosure introduces dynamic and adaptive capabilities to the VPN server which allow the server based control of the VPN connection to measure, collect, and analyze the context of the end-user, device, and the network(s) which are providing the data connection to the first network.

The embodiment of the present disclosure presents security and access capabilities for remote offices and remote employees. The embodiment of the present disclosure is policy based, and the embodiment of the present disclosure presents the capacity to react to changes in those factors of risk, and dynamically act to alter an end-user's access privilege according to those changes. For example, if the user has remote access to the enterprise network from using a device of the enterprise to using a private device of the user, and/or from using a contracted WiFi to using a public WiFi, the user's access privilege will be reduced according to the policy. Allowing the enterprise to prescribe policy to user context and behavior, and to balance the risk to data security and integrity, against the business-driven access needs of remote users is a new and unique capability.

According to the embodiment of present disclosure, the VPN server may collect the trust data from the user, the device, and networks which connect the device to the enterprise network. For example, the trust data may come from a variety of sources, including standards such as Application Programming Interfaces (OneAPI), Machine to Machine (OneM2M), a carrier Service Delivery Platform (SDP), Platform-as-a-Service (Paas) implemented in the end device of the user or carrier networks. Optionally, the trust data may be also obtained from some agent software and/or data collection software in the VPN server itself, or other sources from within the enterprise. These trust data may be carried in a dedicated signaling or an existing signaling.

According to the embodiment of present disclosure, the access zone may be defined as a dedicated or shared network comprised of a sub-network, for example, a subnet as an OSI layer-3 TCP/IP routing network, or a virtual network, for example, a VLAN as an OSI layer-2 Ethernet transport network. The access zone could be a physical construct within a physical switch, a logical construct within a physical network, or a functional construct between physical network infrastructures. Each of the plurality of access zones may be specific to the user, or shared by the user and other users. For example, each set of access zones is specific to a user, role, or set of users and/or set of roles, and the embodiments of the present disclosure are not limited thereto. Optionally, each set of access zones can be implemented as a shared zone for all users/roles, or on a per-user, per-connection, or per-role basis. These zone assignments can be statically defined, or dynamically computed based on the trust data described above. Each of the plurality of access zones provides at least one of an application, a service and data of the enterprise. The plurality of access zones may be distributed in other computing devices or servers, and the embodiments of the present disclosure are not limited thereto. Optionally, the plurality of access zones may be located in a single device or server.

According to the embodiment of present disclosure, the user may be an employee or role in the enterprise. For example, an accountant or a network administrator is a role in the enterprise.

Optionally, as another embodiment of the present disclosure, the method of FIG. 1 further includes: monitoring, by the VPN server, a change of the trust data; determining, by the VPN server, a second trust level corresponding to changed trust data according to a third correspondence if the VPN server obtains the changed trust data, wherein the third correspondence comprises the changed trust data and the second trust level; determining, by the VPN server, a second access zone of the first network corresponding to the second trust level according to a fourth correspondence, wherein the fourth correspondence comprises the second trust level and the second access zone; and establishing, by the VPN server, a second VPN connection between the device and the second access zone.

Specifically, the VPN server may dynamically monitor the VPN connection between the user's device and the first network for changes in trust data. The VPN server may change the depth (height) of remote access of the user according to the change in the trust data. In other words, a dynamic connection is established from the user's device or network attach point to a multi-layered set of networks, depending on role, user, and trust in the device used by the user, in a second network which connects the device to the first network, and in the identity of the user. Each user or set of users or roles can have a different and dynamic level of remote access, with the depth of remote access to enterprise applications, data, and services dependent on the currently determined trust level. In other words, the depth of the remote access is determined by the VPN server as a computed trust level based on a variety of configurable and extensible data elements using an established set of scoring policies. Changes in the contributors of trust for a given user or set of users can cause the depth of access and visibility of network services to be dynamically changed. The VPN server may dynamically adjust or change the trust level of the remote access according to the varying trust data related to the remote access of the user, thus providing a real-time adaptive security capability with the VPN.

Optionally, as another embodiment of the present disclosure, the method of FIG. 1 further includes: comparing, by the VPN server, the second trust level with the first trust level; and keeping, by the VPN server, the first VPN connection alive if the second trust level is higher than the first trust level.

In other words, when the VPN server determines that the trust level of the remote access of the user may be increased according to the currently collected trust data, the VPN server shall allow the user to have remote access an access zone corresponding to the previous trust level and another access zone corresponding to the increased trust level simultaneously.

Optionally, as another embodiment of the present disclosure, the method of FIG. 1 further includes: closing, by the VPN server, the first VPN connection if the second trust level is lower than the first trust level.

In other words, when the trust level of the remote access of the user is decreased according to the currently collected trust data, the VPN Server shall allow the user to merely have remote access to the access zone corresponding to the currently decreased trust level. The remote access to the access zone corresponding to the previous trust level will be disabled due to the decreased trust level.

Optionally, as another embodiment of the present disclosure, the method of FIG. 2 further includes: monitoring, by the VPN server, a change of the trust data; determining, by the VPN server, a second trust level corresponding to changed trust data according to a third correspondence if the VPN server obtains the changed trust data, wherein the third correspondence comprises the changed trust data and the second trust level; determining, by the VPN server, a second access zone of the first network corresponding to the second trust level according to a fourth correspondence, wherein the fourth correspondence comprises the second trust level and the second access zone; modifying, by the VPN server, configuration of the first VPN connection so that the first VPN connection is changed into a second VPN connection between the device and the second access zone.

In other words, when the trust data varies, the VPN is modified to include or exclude the appropriate access zones. For example, when the VPN server determines that the trust level is level 1, the VPN enable the VPN to include the first access zone, while when the VPN server determines that the trust level is level 2, the configuration of the first VPN connection is modified to enable the VPN to include the second access zone and/or exclude the first access zone.

Optionally, as another embodiment of the present disclosure, the method of FIG. 1 further includes: determining, by the VPN server, there is a third trust level corresponding to the user, wherein the third trust level is lower than the first trust level; determining, by the VPN server, a third access zone of the first network corresponding to the third trust level according to a fifth correspondence, wherein the fifth correspondence comprises the third trust level and the third access zone; establishing, by the VPN server, a third VPN connection between the device and the third access zone.

According to embodiments of present disclosure, the trust data comprises at least one of a trust data element for determining whether the user is reliable, a trust data element for determining whether the device is reliable, and a trust data element for determining whether a second network which connects the device to the first network is reliable.

Specifically, the VPN server may implement one or more methods of determining whether a designated user or set of users, the second network which connects those users to the first network, and the device being used to request remote access is reliable. For example, the VPN server collects the trust data elements from the user, the user's device, the user's access network, the carrier network (e.g., Internet Service Provider), and the Internet Exchange networks that provide the connections between the end user and the VPN Server.

Optionally, as another embodiment of the present disclosure, the trust data further comprises information for indicating that the remote access passes a third network which fails to provide a trust data element for determining whether the third network is reliable, and the first trust level is lower than a trust level of remote access determined by the at least one trust data element which does not comprise the information.

For example, it is possible that the collection of trust data elements for determining whether the third network is reliable is not supported, or not available in some of the data sources. In this case, "no answer" or "query rejected" is acceptable responses or valuable data points for evaluation of the trust level. For example, the VPN server may make a query to a server of the third network for the trust data elements, and if the server of the server has no answer or rejects the query, the third network may be considered as an unknown or untrusted network. Being connected to, or through, an unknown or untrusted network as part of the end-to-end connection decreases the level of trust in the remote access or the end-to-end connection (e.g. a TCP connection from the end device of the user to an enterprise edge network and a VPN Server), and could lower the level of trust in the remote access or the end-to-end connection and decrease the depth of allowed remote access based on the trust policy.

According to embodiments of present disclosure, the trust data element for determining whether the user is reliable comprises: an identification of the user, a biometric key, a password, a Personal Identification Number (PIN), an Radio Frequency Identification (RFID) tag, or an Near Field Communication (NFC) Tag.

For example, the identification of the user may be fixed or dynamic user-ID; the password may be a fixed password, a dynamic/One-Time password, or an Short Messaging Service (SMS)-supplied password, etc., which may be input by the user through a user interface displayed on the device used by the user; the biometric key may be a DNA, or a key collected by a camera for facial recognition, a fingerprint scanner, or a heartbeat monitor, voice recognition; the PIN may be a fixed PIN, a One-time PIN, an SMS-supplied PIN, etc., which may be input by the user through a user interface displayed on the device used by the user; the RFID tag may be entered by an RFID Jewelry, an RFID Keychain, or a Employee badge; the NFC Tag may be entered by an NFC Jewelry, or a Mobile NFC chip, etc. These trust data may be carried in the remote access request. Optionally, the VPN sever may send a dedicated signalling for requesting the trust data to the device after receiving the remote access request, and the device may send a response which carries the trust data to the VPN server so that the VPN server can obtain the trust data from the response.

For example, the trust data element for determining whether the device is reliable comprises: a serial number, a MAC Address, an IMEI of the device, a SIM number, or a GPS position. These trust data may be carried in the remote access request. Optionally, the VPN sever may send a dedicated signalling for requesting the trust data to the device after receiving the remote access request, and the device may send a response which carries the trust data to the VPN server so that the VPN server can obtain the trust data from the response.

For example, the second network includes at least one of an access network and a carrier network, and an Internet exchange network.

The trust data element for determining whether the access network is reliable comprises: a MAC address, a WiFi Service Set Identifier (SSID), a session cookie or a key. For example, the MAC address may be an MAC access of an access gateway in the access network, the WiFi SSID may be a WiFi SSID of a wireless access point in the access network, and the session cookie or the key may refer to a history record generated when the user accesses the first network through the access network. These trust data may be carried in the remote access request. Optionally, the VPN sever may send a dedicated signalling for requesting the trust data to the device used by the user or the access point, and the device or the access point may send a response which carries the trust data to the VPN server so that the VPN server can obtain the trust data from the response.

The trust data element for determining whether the carrier network is reliable comprises: an IMEI, an SIM number, subscriber data, a mobile network location, network presence information (for example, Rich Communication Suit (RCS)), a home mobile network status, or a roaming mobile network status. For example, the VPN server may send a request to the device to obtain the IMEI or SIM number, and determine whether the carrier network which provides the IMEI or SIM number may be trusted according to the IMEI or SIM number. Further, the VPN may send a request which carries the IMEI or SIM number to a server of the carrier network to obtain subscriber data, a mobile network location, network presence information, a home mobile network status or a roaming mobile network status.

The trust data element for determining whether the Internet exchange network is reliable comprises: a route, a packet forwarding path, or a hop count. For example, the VPN server may obtain this trust data element from a header of a packet transmitted between the device and the first network.

According to embodiments of present disclosure, the plurality of access zones comprise a demilitarized zone (DMZ) which has a lower trust level than trust levels corresponding to other access zones in the plurality of access zones.

For example, the VPN Server creates (if none exist), or utilizes (if pre-existing) a set of network zones with varying sets of services visible in each zone. For example, the least trusted zone (commonly known as a DMZ) might only allow remote access to enterprise tools and data necessary to gain deeper trust level of access, such as virus scanners, software updates, or device utilities, and allow access to instructions on steps necessary to gain additional trust. A second level (depth) of zone might allow remote access to an enterprise electronic mail and calendar services, but not remote access to email attachments or enterprise file downloads. A third level of zone might allow remote access to attachments and file downloads.

The embodiments of the present disclosure are described in details in conjunction with specific examples below.

Figure 3:
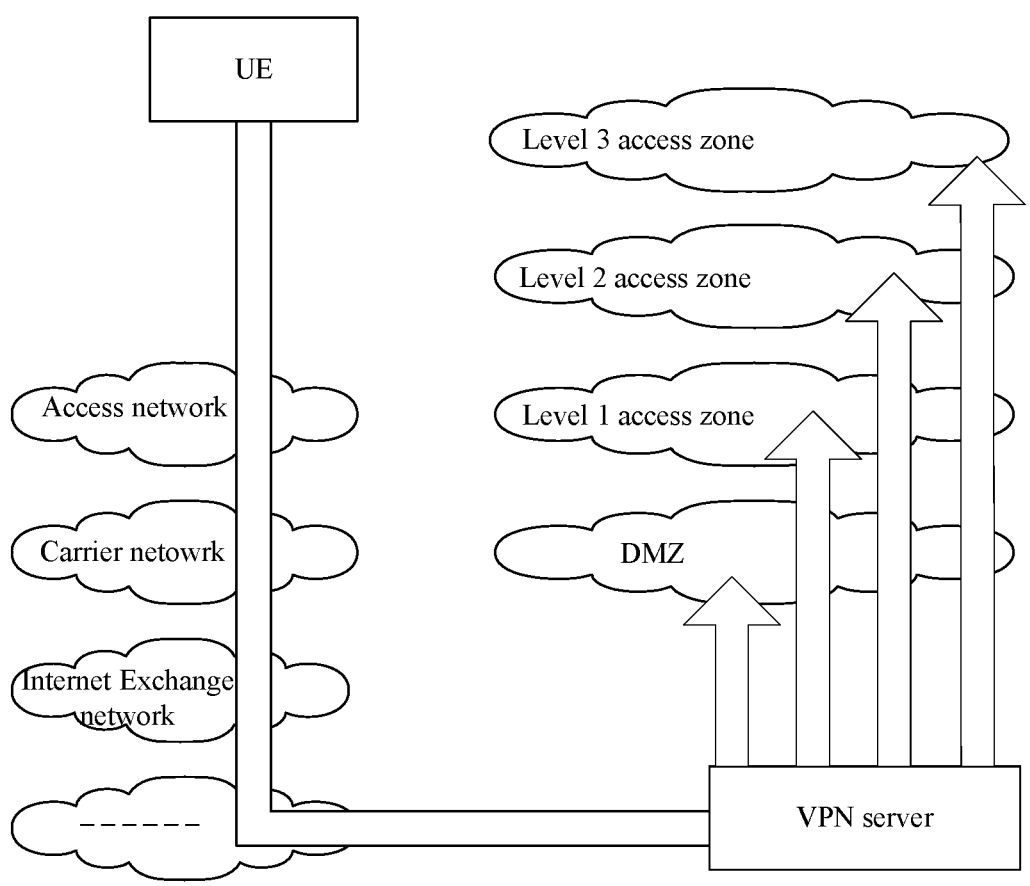
FIG. 3 is a schematic diagram illustrating remote access to a plurality of zones with different trust levels of an enterprise network according to an embodiment of the present disclosure.

FIG. 3 is a schematic diagram illustrating remote access to a plurality of zones with different trust levels of an enterprise network according to an embodiment of the present disclosure. The enterprise network is an example of the network 110 of FIG. 1.

In the embodiment of the present disclosure, the established public network (or Internet connection) and traditional VPN access services may be used. Further, the embodiment of the present disclosure utilizes additional software, a trust policy, data elements, virtual and/or transient networks (VLANs, VxLANs, TCP/IP subnets, etc.), and operational logic to create a secured network connection based on at least one trust data element (external input) to establish identity, authentication, trust, and/or entitlement.

The identity may be established by a employee badge (NFC/RFID), a SmartCard, a fingerprint, facial Recognition, an employee ID (Number Pad Input), DNA sampling, Voice Recognition, etc.

The authentication may be established by a biometric key (fingerprint, facial recognition, DNA sampling, heartbeat pattern, or the like), a password (one-time, static, dynamic, SMS-provided), a PIN number, trusted agent intervention, or the like.

The trust may be determined by context/history of the remote access of the user, for example, a location (GPS location, GPRS network location, known WiFi or network anchor points, other nearby indicators), a screen type, behavior deviations (a new location, a new network, a new country, a public access network, a new device, too many password/PIN retries, etc.) etc. It shall be noted that any data elements could be added here to track "unusual" or suspect behavior which would lower trust in the user or session's validity. For example, the user buys a new phone which is not recognized by the VPN server according to the trust policy, the user moves from a trusted location to an untrusted location, or the user enters too many error passwords.

Additionally, more static entitlement policies may be established by using a "White List" of allowed device or network, etc., "Black List" of denied device or network, etc., and/or "Grey List" of conditions of policy change for Identity, authentication and trust, thus affecting the processing and access controls of devices, device Types, end-users, locations, and/or other relevant factors.

In this embodiment, a simple scenario of secure remote access utilizes some of the possible sensors and inputs to establish identity, authentication, trust, and simple entitlement, and the embodiment of the present disclosure is not limited thereto. Optionally, additional sensors, inputs, and policy rules could be used to create dynamic and complex combinations of policies, rules, and requirements for secured network access.

Referring to FIG. 3, the VPN server creates a plurality of access zones of the enterprise network: untrusted enterprise access Zone (also called DMZ), and Level 1 access zone (least trusted) through Level 3 access zone (most trusted). Each level of deeper or higher remote access includes remote access to the services of this level of access zone, as well as remote access to the "shallower" or lower level of access zone. For example, remote access to Level 1 access zone may include access to e-mail and calendar services, while remote access to Level 2 access zone may include access to File Transfer, Web Application, and Travel Planning, in addition to access to e-mail and calendar inherited from Level 1 access zone.

Table 1 shows an example of determining the remote access of the user to different access zones corresponding to different trust level according to a trust policy.

Referring to Table 1, for Bob, trust level 1 is determined as a trust level of the remote access if Bob logs in to the enterprise VPN server using an enterprise device on any network, and Bob is first approved to access the DMZ which allows remote access to enterprise tools and data necessary to gain deeper remote access such as virus scanners, software updates, or device utilities and instructions on steps necessary to gain additional trust; trust level 2 is determined if Bob further enters a valid user-ID/pass word, and Bob is further approved to access a zone in which email, calendar, and travel plans are provided; trust level 3 is determined as the trust level of the remote access if Bob further enters the fingerprint, and Bob is further approved to access a zone in which attachments and workflows are provided; trust level 4 is determined as a trust level of the remote access if Bob logs in to the enterprise VPN server using an enterprise device on an enterprise device, and entering a user-ID/password and One-Time PIN SMS, and Bob is further approved to access a zone in which source-code, roadmaps and sensitive data are provided.

For an accounting role, if the accounting role logs in to the enterprise VPN server using an enterprise device on an enterprise network (for example, enterprise WiFi), and enters a user-ID/fingerprint, facial recognition information, and a One-Time Password, trust level 4 is determined as a trust level of the remote access, and the accounting role will be approved to access a zone in which Invoices, Account receivable (AR)/Account Payable (AP) Applications (APPs), AP Approvals and Travel Apps are provided.

TABLE 1

|  | Requirements | Network Access Zone | Requirements | Network Access Zone |
| --- | --- | --- | --- | --- |
| User/Role | Bob |  | Accounting Role |  |
| Trust Level 1 | Enterprise Device Any Network | DMZ |  |  |
| Trust Level 2 | +User-ID/Password | Email Calendar Travel plans |  |  |
| Trust Level 3 | +Fingerprint | Attachments Workflows |  |  |
| Trust Level 4 | Enterprise Device Enterprise Network User-ID/Password One-Time PIN SMS | Source-Code Roadmaps Sensitive Data | Enterprise Device Enterprise Network User-ID/Fingerprint Facial Recognition One-Time Password | Invoices AR/AP Apps AP Approvals Travel Apps |

The secure remote Access Server collects the data elements necessary to "compute" and assign or reject a requested connection from a user device. The user's connection (VPN) is then established to include the appropriate zone or zones by assessing the user and role policies, and applying a combining or revoking scheme.

For the sake of simplicity, the trust policy for computing a trust level of the remote access is described by taking a score policy as an example. For example, the trust policy could assign values to certain trust data elements by doing basic addition. The network score, device score, user score, location score, etc. may be added to generate a number. If the number meets a threshold, then the remote access of the user is approved or assigned to a certain trust level. If the number drops below the threshold, then the remote access of the user will be degraded. In addition, some trust policies might be "never". For example, the trust policy may indicate never trust in remote access when the user has remote access in some locations like some countries, or never trust in remote access when the user has remote access on public WiFi like a coffee shop.

In other words, when the trust data elements are changed, the trust level of the remote access might be changed correspondingly. If the VPN server determines that the trust level of the remote access may be increased according to the trust policy and the current trust data elements, the VPN server will establish a VPN connection between the user's device and an access zone corresponding to a higher trust level. If the VPN server determines that the trust level of the remote access needs to be decreased according to the trust policy and the current trust data elements, the VPN server will establish a VPN connection between the user's device and an access zone corresponding to a lower trust level. Optionally, as another embodiment of the present disclosure, if the VPN server determines that the trust level of the remote access needs to be increased according to the trust policy and the current trust data elements, the VPN server may modify a VPN connection between the user's device and an access zone corresponding to a lower trust level into a VPN connection between the user's device and an access zone corresponding to a higher trust level, and if the VPN server determines that the trust level of the remote access needs to be decreased according to the trust policy and the current trust data elements, the VPN server will modify a VPN connection between the user's device and an access zone corresponding to a higher trust level into a VPN connection between the user's device and an access zone corresponding to a lower trust level.

Figure 4:
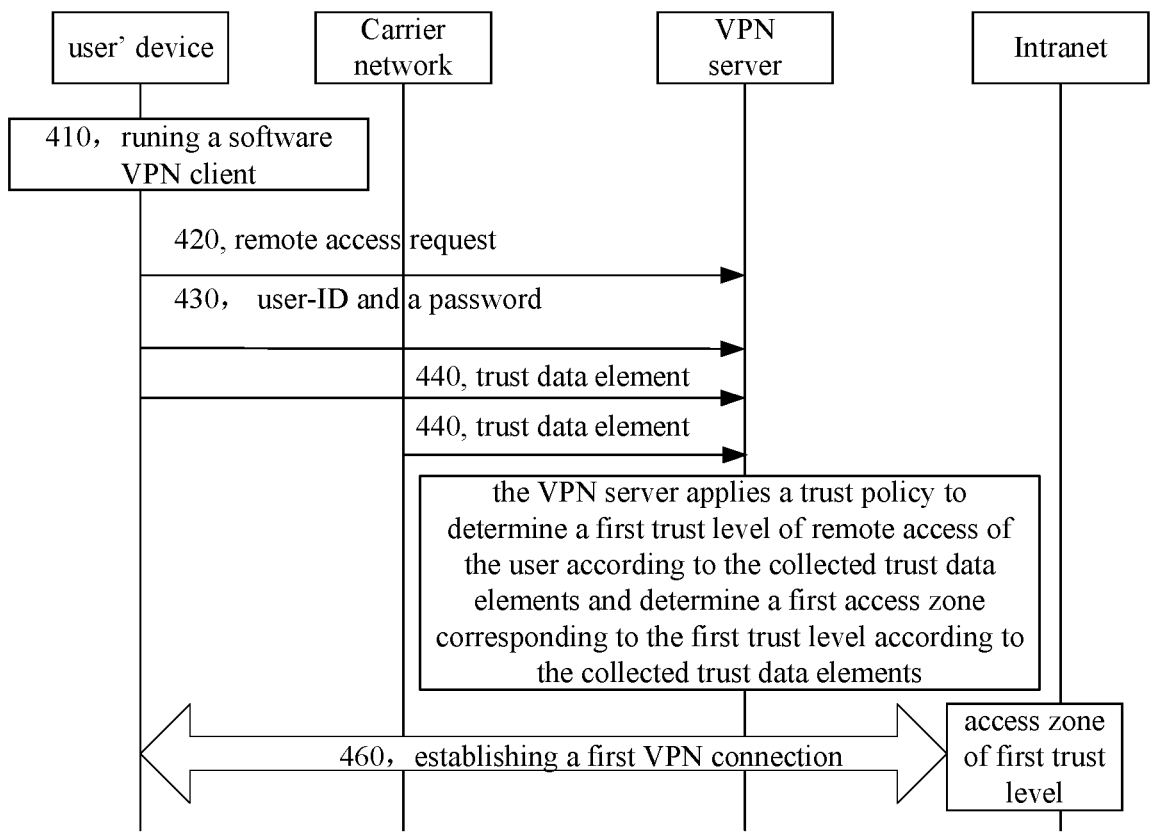
FIG. 4 illustrates a schematic flow chart of a method for remote access according to another embodiment of the present disclosure.

FIG. 4 illustrates a schematic flow chart of a method for remote access according to another embodiment of the present disclosure. The method of FIG. 4 is an example of the method in FIG. 2. The method of FIG. 4 includes the following contents.

410, a user runs a software VPN client on an end device.

For example, when the user wants to access an enterprise network through the Internet outside the enterprise network, the user may run a software VPN client installed on the end device.

420, the end device sends a remote access request to the VPN server.

For example, the end device shall send the remote access request to the VPN server when the software VPN client is run.

430, the user may enter a VPN client user-ID and a password so as to log in to the VPN server.

For example, the user may enter the VPN client user-ID and the password through a user interface on the VPN client so as to log in to the VPN server, and the VPN server performs an authentication on the identity of the user based on the VPN client user-ID and the password.

440, the VPN server collects trust data elements.

In this embodiment, in addition to the VPN client user-ID and the password which have been obtained in 430, other trust data elements may be collected by the VPN server from the user, the end device used by the user, the user's access network, the carrier network (operated by an Internet Service Provider), and the Internet Exchange networks that provide the connections between the user and the VPN Server.

The VPN server may obtain the trust data element for determining whether the user is reliable, i.e., identity and authentication information, which includes: information about the identity of the user plus a password, a biometric key, a PIN or a RFID/NFC Tag. For example, the identity information may include a fixed or dynamic user-ID. The biometric key may be facial recognition information from a camera, a fingerprint information from a fingerprint scanner, DNA sampling, a heartbeat from a heartbeat monitor, or the like. The password may be a fixed password, a dynamic/One-Time password, or an SMS-supplied password, or the like. The PIN may be a fixed PIN, a One-time PIN, an SMS-supplied PIN, or the like. The RFID/NFC Tag may be obtained from an employee badge, a mobile NFC chip, a NFC/RFID Jewelry, an RFID keychain, etc.

The trust data element for determining whether the end device is reliable may be a serial number, a MAC Address, an IMEI of the device, a Mobile SIM Card ID number, GPS location information, a Personal Unblocking Key (PUK), or the like. The GPS location information may be a device-generated GPS location, an MBB MiFi gateway's GPS location, a network-generated tower triangulation location, or the like.

The trust data element for determining whether the access network is reliable may be an MAC address, a WiFi SSID, a session cookie or a key, or the like. These trust data elements may be used to validate the access point as well as the end device.

The trust data element for determining whether the carrier network is reliable may be an IMEI, an SIM number, subscriber data, a mobile network location, network presence information, a home mobile network status, a roaming mobile network status or the like.

The trust data element for determining whether the Internet exchange network is reliable comprises: a route, a packet forwarding path, or a hop count.

It shall be noted that the above 403 and 404 may be executed simultaneously or there is no limitation on the order by which those two steps are executed.

450, the VPN server applies a trust policy to determine a first trust level of remote access of the user according to the collected trust data elements and determine a first access zone corresponding to the first trust level according to the collected trust data elements.

The trust policy is used for indicating or includes a first correspondence of trust data elements and trust levels as well as a second correspondence of the trust levels and access zones of the network.

The VPN server could choose to allow or disallow certain devices, or certain device types from connecting to the enterprise network.

For example, the VPN server may be aware of all of the access points inside the enterprise's WiFi network, and thus could determine that the access points is more reliable; the VPN server may determine that a contracted carrier's WiFi in a coffee shop is more reliable, but not trust in a public WiFi or unknown connections.

For example, if the enterprise has a contract with a certain carrier, then the carrier can assure security of the path of traffic from the end device to the enterprise network, and thus the VPN server may determine that the remote access through the network of the carrier is more reliable; if an employee of the enterprise is roaming on business travel in another country, and the roaming carrier is not one of the enterprise's assured carriers, the VPN server fails to know what links are being used, or what pipes are carrying the traffic, and thus the VPN server may determine that the remote access through the network of the carrier is less or even not reliable.

For example, the VPN server may be aware of the change of the user's situation according to these trust data elements, and thus does not trust in the path between the user and the enterprise network. In this case, the trust in the remote access needs to be re-evaluated.

460, the VPN server establishes a VPN connection between the user's device and a first access zone.

For example, the VPN server grants the end device a secured tunnel through the VPN server to a correct trust level of access zone. The tunnel is compatible with conventional protocol and encryption standards, and thus will not be described redundantly herein.

Figure 5:
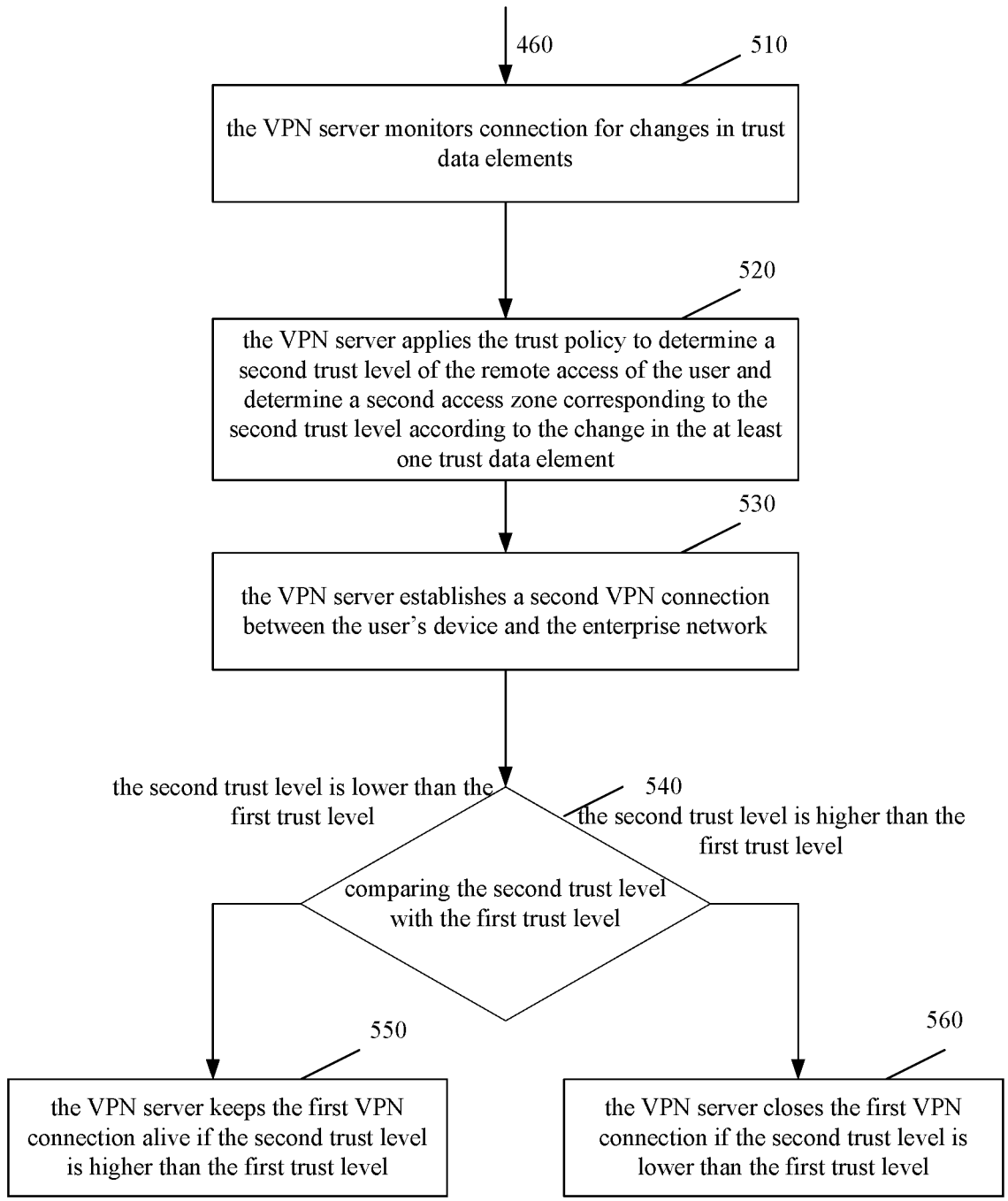
FIG. 5 illustrates a schematic flow chart of a method for remote access according to another embodiment of the present disclosure.

FIG. 5 illustrates a schematic flow chart of a method for remote access according to another embodiment of the present disclosure. The method of FIG. 5 is an example of the method in FIG. 1. The method of FIG. 5 includes the following contents.

In this embodiment, suppose that a first VPN connection has been established between the user's device and the enterprise network as described in the embodiment of FIG. 4. Specifically, after determining a first trust level of the remote access of the user according to the previously collected trust data elements, the VPN server establishes the first VPN connection between the user's device and the enterprise network so that the user can have remote access to the first access zone through the first VPN connection. In addition, in this embodiment, the VPN server could continue to monitor the trust data elements used to compute the reliability of the user and the connection (e.g., TCP/IP connection) between the user and the VPN server, and dynamically change the trust level of the remote access, i.e., move the users' depth or height of access zone either up or down according to the trust policy.

510, the VPN server monitors connection for changes in trust data elements.

The VPN server continues to collect current trust data elements and determines whether the trust data elements are changed or whether the current trust data elements are different from the previous trust data elements.

520, the VPN server applies the trust policy to determine a second trust level of the remote access of the user and determine a second access zone corresponding to the second trust level according to the change in the at least one trust data element.

If the trust data elements are changed, the VPN server determines a second trust level of the remote access of the user according to the changed trust data elements and the trust policy.

530, the VPN server establishes a second VPN connection between the user's device and the enterprise network so that the user can have remote access to the second access zone through the second VPN connection.

540, the VPN server compares the second trust level with the first trust level. If the second trust level is higher than the first trust level, continue to 550, and if the second trust level is lower than the first trust level, continue to 560.

550, the VPN server keeps the first VPN connection alive if the second trust level is higher than the first trust level.

560, the VPN server closes the first VPN connection if the second trust level is lower than the first trust level.

For example, if the VPN server first finds that the access network of the remote access of the user is an enterprise network (e.g., the WIFI of the enterprise) and the device used by the user is any device, or finds that the access network of the remote access of the user is any network (e.g., the home network of the user) and the device used by the user is an enterprise device, the VPN server determines that the trust level of the remote access of the user is the first trust level. If the VPN server then finds that the user further enters a valid identity and a password, the VPN server determines that the trust level of the remote access of the user may be changed or increased to the second remote level which is higher than the first second level. If the VPN server then finds that the user further enters an untrusted network according to the trust data element from the untrusted network, the VPN server determines that the trust level of the remote access of the user needs to be decreased to the first second level.

Figure 6:
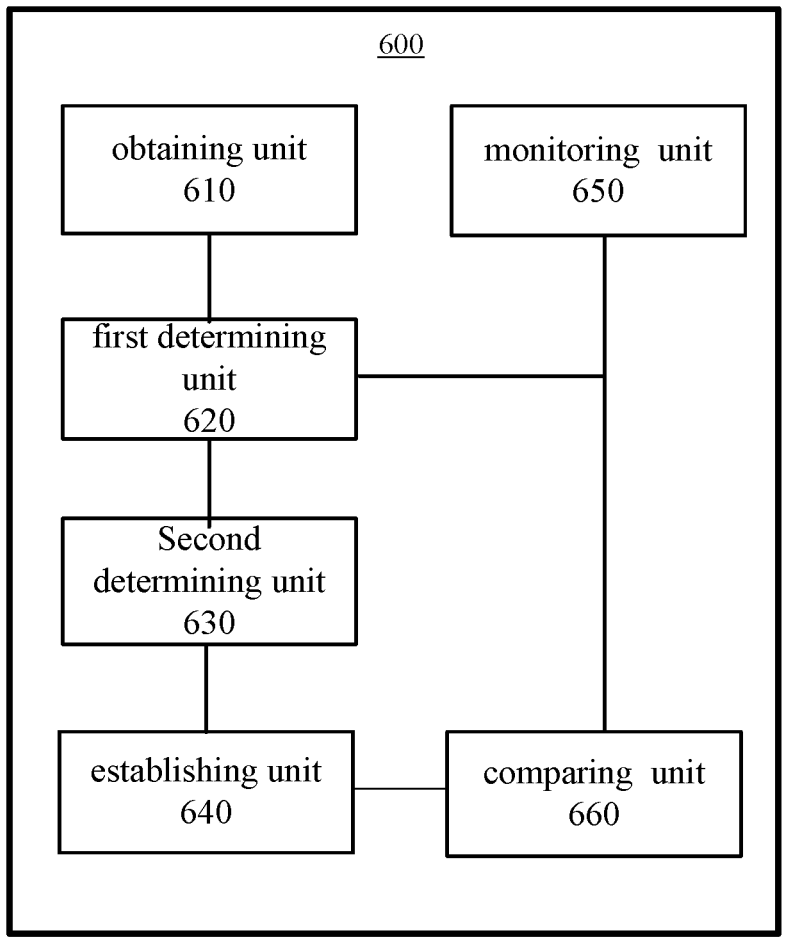
FIG. 6 illustrates a schematic diagram of a VPN server according to an embodiment of the present disclosure.

FIG. 6 illustrates a schematic diagram of a server 600 according to another embodiment of the present disclosure. The server 600 may be a VPN server, which includes an obtaining unit 610, a first determining unit 620, a second determining unit 630 and an establishing unit 640.

The obtaining unit 610 is configured to obtain trust data of a user accessing a first network. The first determining unit 620 is configured to determine a first trust level corresponding to the trust data according to a first correspondence, wherein the first correspondence comprises the trust data and the first trust level. The second determining unit 630 is configured to determine a first access zone of the first network corresponding to the first trust level according to a second correspondence, wherein the second correspondence comprises the first trust level and the first access zone. The establishing unit 640 is configured to establish a first VPN connection between a device used by the user and the first access zone.

Optionally, as another embodiment of the present disclosure, the server 600 further comprises: a monitoring unit 650. The monitoring unit 650 is configured to monitor a change of the trust data. The first determining unit 620 is further configured to determine a second trust level corresponding to the changed trust data according to a third correspondence if the monitoring unit 650 obtains the changed trust data, wherein the third correspondence comprises the changed trust data and the second trust level; the second determining unit 630 is further configured to determine a second access zone of the first network corresponding to the second trust level according to a fourth correspondence, wherein the fourth correspondence comprises the second trust level and the second access zone; the establishing unit 640 is further configured to modify configuration of the first VPN connection so that the first VPN connection is changed into a second VPN connection between the device and the second access zone.

Optionally, as another embodiment of the present disclosure, the server 600 further comprises: a comparing unit 660. The comparing unit 660 is configured to compare the second trust level with the first trust level. The establishing unit 640 is further configured to keep the first VPN connection alive if the second trust level is higher than the first trust level, and close the first VPN connection if the second trust level is lower than the first trust level.

Optionally, as another embodiment of the present disclosure, the server 600 further comprises: a monitoring unit 650. The monitoring unit 650 is configured to monitor a change of the trust data; the first determining unit 620 is further configured to determine a second trust level corresponding to the changed trust data according to a third correspondence if the monitoring unit 650 obtains the changed trust data, wherein the third correspondence comprises the changed trust data and the second trust level; the second determining unit 630 is further configured to determine a second access zone of the first network corresponding to the second trust level according to a fourth correspondence, wherein the fourth correspondence comprises the second trust level and the second access zone; and the establishing unit 640 is further configured to modify configuration of the first VPN connection so that the first VPN connection is changed into a second VPN connection between the device and the second access zone.

Optionally, as another embodiment of the present disclosure, the first determining unit 620 is further configured to determine there is a third access zone corresponding to the user, wherein the third trust level is lower than the first trust level; the second determining unit 630 is further configured to determine a third access zone of the first network corresponding to the third trust level according to a fifth correspondence, wherein the fifth correspondence comprises the third trust level and the third access zone; and the establishing unit 640 is further configured to establish a third VPN connection between the device and the third access zone.

According to embodiments of the present disclosure, the trust data comprises at least one of a trust data element for determining whether the user is reliable, a trust data element for determining whether the device is reliable, and a trust data element for determining whether a second network which connects the device to the first network is reliable.

Optionally, as another embodiment of the present disclosure, the trust data further comprises information for indicating that the remote access passes a third network which fails to provide a trust data element for determining whether the third network is reliable, and the first trust level is lower than a trust level of remote access determined by the at least one trust data element which does not comprise the information.

According to embodiments of the present disclosure, the trust data element for determining whether the user is reliable comprises an identification of the user, a biometric key, a password, a PIN, a RFID tag, or an NFC Tag, wherein the trust data element for determining whether the device is reliable comprises a serial number of the device, an MAC address of the device, an IMEI of the device, an SIM of the device number of the device or a GPS position of the device, wherein the second network comprises at least one of an access network and a carrier network, and an Internet exchange network.

According to embodiments of the present disclosure, the trust data element for determining whether the access network is reliable comprises: an MAC address, a WiFi SSID, a session cookie or a key, the trust data element for determining the carrier network is reliable comprises: an IMEI, an SIM number, subscriber data, a mobile network location, network presence information, a home mobile network status, or a roaming mobile network status, and the trust data element for determining whether the Internet exchange network is reliable comprises: a route, a packet forwarding path, or a hop count.

According to embodiments of the present disclosure, the plurality of access zones comprise a DMZ, which has a lower trust level than trust levels corresponding to other access zones in the plurality of access zones.

According to embodiments of the present disclosure, each of the plurality of access zones is specific to the user, or shared by the user and other users.

According to embodiments of the present disclosure, the first network is a network of an enterprise, and each of the plurality of access zones provides at least one of an application, a service and data of the enterprise.

According to embodiments of the present disclosure, the first network is a network of an enterprise, and the user is an employee or role of the enterprise.

The server 600 may perform each process of the method as shown in FIG. 2, and thus will not be described redundantly herein.

Figure 7:
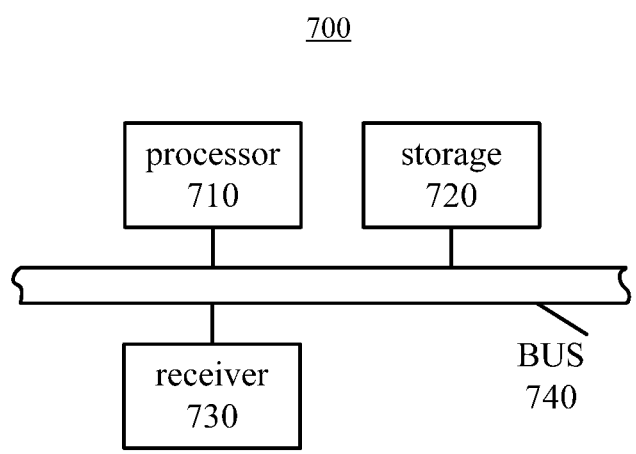
FIG. 7 illustrates a schematic diagram of a VPN server according to another embodiment of the present disclosure.

FIG. 7 illustrates a schematic diagram of a server 700 according to another embodiment of the present disclosure. The server 700 may be a VPN serve, which includes a processor 710, a storage 720, receiver 730 and bus 740.

The receiver 730 is configured to obtain trust data of a user accessing a first network.

The processor 710 is configured to call codes stored in the storage 720 through the bus 740 to determine a first trust level corresponding to the trust data according to a first correspondence, wherein the first correspondence comprises the trust data and the first trust level; determine a first access zone of the first network corresponding to the first trust level according to a second correspondence, wherein the second correspondence comprises the first trust level and the first access zone; and establish a first VPN connection between a device used by the user and the first access zone.

Optionally, as another embodiment of the present disclosure, the receiver 730 is further configured to monitor a change of the trust data. The processor 710 is further configured to determine a second trust level corresponding to the changed trust data according to a third correspondence if the receiver 730 obtains the changed trust data, wherein the third correspondence comprises the changed trust data and the second trust level; determine a second access zone of the first network corresponding to the second trust level according to a fourth correspondence, wherein the fourth correspondence comprises the second trust level and the second access zone; and modify configuration of the first VPN connection so that the first VPN connection is changed into a second VPN connection between the device and the second access zone.

Optionally, as another embodiment of the present disclosure, the processor 710 is further configured to compare the second trust level with the first trust level; keep the first VPN connection alive if the second trust level is higher than the first trust level; and close the first VPN connection if the second trust level is lower than the first trust level.

Optionally, as another embodiment of the present disclosure, the receiver 730 is further configured to monitor a change of the trust data. The processor is further configured to determine a second trust level corresponding to the changed trust data according to a third correspondence if receiver 730 obtains the changed trust data, wherein the third correspondence comprises the changed trust data and the second trust level; determine a second access zone of the first network corresponding to the second trust level according to a fourth correspondence, wherein the fourth correspondence comprises the second trust level and the second access zone; and modify configuration of the first VPN connection so that the first VPN connection is changed into a second VPN connection between the device and the second access zone.

Optionally, as another embodiment of the present disclosure, the processor 710 is further configured to determine there is a third access zone corresponding to the user, wherein the third trust level is lower than the first trust level; determine a third access zone of the first network corresponding to the third trust level according to a fifth correspondence, wherein the fifth correspondence comprises the third trust level and the third access zone; and establish a third VPN connection between the device and the third access zone.

According to embodiments of the present disclosure, the trust data comprises at least one of a trust data element for determining whether the user is reliable, a trust data element for determining whether the device is reliable, and a trust data element for determining whether a second network which connects the device to the first network is reliable.

According to embodiments of the present disclosure, the trust data element for determining whether the access network is reliable comprises: an MAC address, a WiFi SSID, a session cookie or a key, the trust data element for determining whether the carrier network is reliable comprises: an IMEI, an SIM number, subscriber data, a mobile network location, network presence information, a home mobile network status, or a roaming mobile network status, and the trust data element for determining whether the Internet exchange network is reliable comprises: a route, a packet forwarding path, or a hop count.

According to embodiments of the present disclosure, the plurality of access zones comprise a DMZ which has a lower trust level than trust levels corresponding to other access zones in the plurality of access zones.

According to embodiments of the present disclosure, each of the plurality of access zones is specific to the user, or shared by the user and other users.

According to embodiments of the present disclosure, the first network is a network of an enterprise, and each of the plurality of access zones provides at least one of an application, a service and data of the enterprise.

According to embodiments of the present disclosure, the first network is a network of an enterprise, and the user is an employee or role of the enterprise.

The server 700 may perform each process of the method shown in FIG. 2, and thus will not be described redundantly herein.

The persons of ordinary skills in the art may realize that the units and steps of algorithm of the respective examples, described with reference to the embodiments disclosed in the text, can be accomplished by electronic hardware, or a combination of computer software and electronic hardware. Whether these functions are executed by means of hardware or software depends on a specific application and a design constraint condition of the technical solutions. Professional technical personnel may accomplish the described functions by adopting a different method for each specific application, but this kind of accomplishment shall not go beyond the scope of the present disclosure.

Those skilled in the art may understand clearly that, for convenience and simplicity of description, specific working processes of the above-described systems, apparatus and units may be referred to corresponding processes in the aforementioned embodiments of the methods, and will not be described repeatedly herein.

In several embodiments provided by the present application, it shall be understood that disclosed systems, apparatus and methods may be implemented by other manners. For example, the embodiments of the apparatus described above are just illustrative. For example, division of the units is just a kind of division according to logical functions, and there may be other division manners for practical implementations. For example, a plurality of units or components may be combined or integrated into another system, or some features may be neglected or may not be performed. In addition, the shown or discussed mutual coupling or direct coupling or communication link may be an indirect coupling or communication link through some interfaces, apparatus or units, which may be in an electrical form, a mechanical form or in other forms.

The units described as separated parts may be, or may not be, physically separated, and the parts shown as units may be, or may not be, physical units, which may be located in one place or distributed to a plurality of network elements. Part or all units therein may be selected, according to an actual need, to implement the objective of solutions provided in the present disclosure.

In addition, the respective functional units in the respective embodiments of the present disclosure may be integrated into one processing unit, or the respective units may exist separately and physically, or two or more units may be integrated into one unit.

If the function is implemented in the form of a software functional unit and is sold or used as an independent product, the function may be stored in a computer readable storage medium. Based on this understanding, the spirit of the technical solution in the present disclosure may be embodied in the form of a software product. The computer software product is stored in a storage medium, and includes a number of instructions that enable a computer device (may be a personal computer, a server, or a network device) to execute all or part of steps of the method described in the respective embodiments of the present disclosure. The preceding storage mediums include various mediums that can store program codes, such as, a U disk, a removable hard disk, a Read-Only Memory (ROM), a Random Access Memory (RAM), a magnetic disk, an optical disk, or the like.

The foregoing descriptions are merely specific embodiments of the disclosure, rather than limiting the protection scope of the disclosure. It is easy for any one skilled in the art to conceive changes or substitutions within the technical scope disclosed by the disclosure, and the changes or substitutions shall fall in the protection scope of the disclosure. Therefore, the protection scope of the present disclosure shall be defined by the claims.

What is claimed is:

1. A method for remote access, comprising:
   obtaining, by a Virtual Private Network (VPN) server, trust data of a user accessing a first network, wherein the first network comprises a plurality of access zones corresponding to a plurality of trust levels, and wherein the plurality of access zones comprises a first access zone corresponding to a first trust level and a second access zone corresponding to a second trust level;
   determining, by the VPN server, that the trust data corresponds to the first trust level;
   selecting, by the VPN server, the first access zone of the first network for user communications based on the first trust level;
   establishing, by the VPN server, a first VPN connection between a user device and the first access zone;
   monitoring, by the VPN server, the trust data to obtain changed trust data;
   determining, by the VPN server, that the changed trust data corresponds to the second trust level;
   selecting, by the VPN server, the second access zone of the first network for user communications based on second trust level; and
   establishing, by the VPN server, a second VPN connection between the user device and the second access zone based on the changed trust data.

2. The method according to claim 1, further comprising keeping, by the VPN server, the first VPN connection alive when the second VPN connection is established.

3. The method according to claim 1, wherein establishing the second VPN connection comprises modifying, by the VPN server, a configuration of the first VPN connection so that the first VPN connection is changed into the second VPN connection between the user device and the second access zone.

4. The method according to claim 1, further comprising:
   determining, by the VPN server, a third trust level corresponding to the user, wherein the third trust level is lower than the first trust level;
   determining, by the VPN server, a third access zone of the first network corresponding to the third trust level; and
   establishing, by the VPN server, a third VPN connection between the user device and the third access zone.

5. The method according to claim 1, wherein the trust data comprises at least one of a trust data element indicating the user is reliable, a trust data element indicating the user device is reliable, or a trust data element indicating a second network which connects the user device to the first network is reliable.

6. The method according to claim 5, wherein the trust data further comprises information indicating that the remote access traverses a third network which does not provide a trust data element indicating the third network is reliable.

7. The method according to claim 5, wherein the trust data element indicating the user is reliable comprises an identification of the user, a biometric key, a password, a personal identification number (PIN), a Radio Frequency Identification (RFID) tag, or a Near Field Communication (NFC) Tag, wherein the trust data element indicating the user device is reliable comprises a serial number of the user device, a Media Access Control (MAC) address of the user device, an International Mobile Equipment Identity (IMEI) of the user device, a Subscriber Identity Module (SIM) number of the user device, or a Global Positioning System (GPS) position of the user device, and wherein the second network comprises at least one of an access network, a carrier network, or an Internet exchange network.

8. The method according to claim 1, wherein the plurality of access zones and the plurality of trust levels have a one-to-one correspondence.

9. The method according to claim 8, wherein each access zone is specific to a user.

10. The method according to claim 8, wherein each access zone is specific to a user role or a set of user roles.

11. A server, comprising:
    a memory storing computer-readable instructions; and
    a processor coupled to the memory and configured to execute the instructions to:
       obtain trust data of a user accessing a first network, wherein the first network comprises a plurality of access zones corresponding to a plurality of trust levels, and wherein the plurality of access zones comprises a first access zone corresponding to a first trust level and a second access zone corresponding to a second trust level;
       determine that the trust data corresponds to the first trust level;
       select the first access zone of the first network for user communications based on the first trust level;
       establish a first Virtual Private Network (VPN) connection between a user device and the first access zone;
       monitor the trust data to obtain changed trust data;
       determine that the changed trust data corresponds to the second trust level;
       select the second access zone of the first network for user communications based on the second trust level; and
       establish a second VPN connection between the user device and the second access zone based on the changed trust data.

12. The server according to claim 11, wherein the processor is configured to execute the instructions to keep the first VPN connection alive when the second VPN connection is established.

13. The server according to claim 11, wherein the processor is configured to execute the instructions to modify a configuration of the first VPN connection so that the first VPN connection is changed into the second VPN connection between the user device and the second access zone.

14. The server according to claim 11, wherein the processor is configured to execute the instructions to:

determine a third trust level corresponding to the user, wherein the third trust level is lower than the first trust level;

determine a third access zone of the first network corresponding to the third trust level; and establish a third VPN connection between the user device and the third access zone.

15. The server according to claim 11, wherein the trust data comprises at least one of a trust data element indicating the user is reliable, a trust data element indicating the user device is reliable, or a trust data element indicating a second network which connects the user device to the first network is reliable.

16. The server according to claim 15, wherein the trust data further comprises information indicating that the remote access traverses a third network which does not provide a trust data element indicating the third network is reliable.

17. The server according to claim 15, wherein the trust data element indicating the user is reliable comprises an identification of the user, a biometric key, a password, a personal identification number (PIN), a Radio Frequency Identification (RFID) tag, or a Near Field Communication (NFC) Tag, wherein the trust data element indicating the user device is reliable comprises a serial number of the user device, a Media Access Control (MAC) address of the user device, an International Mobile Equipment Identity (IMEI) of the user device, a Subscriber Identity Module (SIM) number of the user device or a Global Positioning System (GPS) position of the user device, and wherein the second network comprises at least one of an access network, a carrier network, or an Internet exchange network.

18. The server according to claim 11, wherein the plurality of access zones and the plurality of trust levels have a one-to-one correspondence.

19. The server according to claim 18, wherein each access zone is specific to a user role or a set of user roles.

20. The server according to claim 11, wherein each access zone is specific to a user.

* * * * *